United States Patent
Bryson et al.

(10) Patent No.: US 9,946,850 B1
(45) Date of Patent: Apr. 17, 2018

(54) PROVIDING TEMPORARY CONTACT INFORMATION

(71) Applicant: International Business Machines Corporation, Armonk, NY (US)

(72) Inventors: Donald L. Bryson, Chattanooga, TN (US); Eric V. Kline, Rochester, MN (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/661,660

(22) Filed: Jul. 27, 2017

Related U.S. Application Data

(63) Continuation of application No. 15/284,736, filed on Oct. 4, 2016.

(51) Int. Cl.
| | | |
|---|---|---|
| G06F 21/60 | (2013.01) | |
| G06F 21/10 | (2013.01) | |
| H04W 12/02 | (2009.01) | |
| H04L 29/06 | (2006.01) | |

(52) U.S. Cl.
CPC .......... *G06F 21/10* (2013.01); *H04L 63/0421* (2013.01); *H04W 12/02* (2013.01)

(58) Field of Classification Search
None
See application file for complete search history.

(56) References Cited

U.S. PATENT DOCUMENTS

| | | | |
|---|---|---|---|
| 6,577,874 B1 | 6/2003 | Dailey | |
| 6,973,166 B1 | 12/2005 | Tsumpes | |
| 7,272,716 B2 | 9/2007 | Haller et al. | |
| 7,555,525 B2 | 6/2009 | Malik | |
| 7,916,675 B2 | 3/2011 | Dalsgaard et al. | |
| 8,201,263 B2 | 6/2012 | Apelqvist | |
| 8,966,096 B2 | 2/2015 | Garcia Jurado Suarez et al. | |
| 9,037,637 B2 * | 5/2015 | Jaye .................... | G06F 21/6254 709/203 |
| 2001/0036224 A1 * | 11/2001 | Demello ................. | H04L 63/30 375/220 |
| 2006/0087410 A1 | 4/2006 | Garcia et al. | |
| 2007/0036296 A1 | 2/2007 | Flanagan et al. | |
| 2007/0249352 A1 * | 10/2007 | Song ....................... | H04L 63/08 455/436 |

(Continued)

FOREIGN PATENT DOCUMENTS

| | | | | |
|---|---|---|---|---|
| EP | 3118769 A1 * | 1/2017 | ............. | G06F 21/62 |
| WO | 9832305 A2 | 7/1998 | | |

(Continued)

OTHER PUBLICATIONS

Anonymous, "Encryption on handheld device with remote server support", ip.com, an IP.com Prior Art Database Technical Disclosure, IP.com No. IPCOM000210519D, IP.com Electronic Publication Date: Sep. 7, 2011, 5 pages.

(Continued)

*Primary Examiner* — Christopher Revak
(74) *Attorney, Agent, or Firm* — Daniel C. Housley

(57) ABSTRACT

Contact information associated with a user is identified. Temporary contact information, exclusive of the contact information, is generated and associated with the user. Termination controls, configured to prevent use of the temporary contact information after the occurrence of an event, are generated and associated with the temporary contact information.

1 Claim, 7 Drawing Sheets

(56) References Cited

U.S. PATENT DOCUMENTS

| | | | |
|---|---|---|---|
| 2009/0036163 A1 | 2/2009 | Kimbrell | |
| 2009/0193249 A1* | 7/2009 | Conrado | H04L 63/0421 |
| | | | 713/156 |
| 2010/0287244 A1* | 11/2010 | Wicks | G06Q 10/107 |
| | | | 709/206 |
| 2012/0079579 A1* | 3/2012 | Kamakura | G06F 21/32 |
| | | | 726/7 |
| 2012/0314860 A1* | 12/2012 | Liu | H04L 63/0414 |
| | | | 380/247 |
| 2015/0026818 A1 | 1/2015 | Lee et al. | |
| 2016/0212121 A1 | 7/2016 | Van de Wetering | |
| 2016/0277923 A1* | 9/2016 | Steffey | H04W 12/04 |
| 2017/0019257 A1* | 1/2017 | Shibutani | G06F 21/35 |
| 2017/0033925 A1* | 2/2017 | DeNeut | G06F 21/00 |
| 2017/0316038 A1* | 11/2017 | Guionneau | G06F 17/30309 |

FOREIGN PATENT DOCUMENTS

| | | |
|---|---|---|
| WO | 2004091234 A1 | 10/2004 |
| WO | 2009124757 A2 | 10/2009 |

OTHER PUBLICATIONS

Job J et al., "A modified secure version of the Telegram protocol (MTProto)", Copyright 2015 IEEE, 6 pages.

Siemens et al., "Secure and automatic way to forward encrypted messages to a delegate", ip.com, an IP.com Prior Art Database Technical Disclosure, Original Publication Date: Feb. 10, 2007, IP.com No. IPCOM000145166D, Copyright: Siemens AG 2007, 5 pages.

Mailinator, Copyright 2015 Manybrain, Inc., https://www.mailinator.com/, 4 pages. Last printed Jun. 30, 2016.

Guerrillamail.com, Copyright 2006-2016, https://www.guerillamail.com/, 2 pages. Last printed Jun. 30, 2016.

RingMeMaybe, Copyright © yourVirtualSIM Inc. 2016, http://www.ringmemaybe.com/, 7 pages. Last printed Jun. 30, 2016.

NumberProxy, Copyright 2014 Monkey King Code, http://www.numberproxy.com/, 1 page. Last printed Jun. 30, 2016.

Bryson et al., "Providing Temporary Contact Information", U.S. Appl. No. 15/284,736, filed Oct. 4, 2016.

List of IBM Patents or Patent Applications Treated as Related, dated Jul. 26, 2017, pp. 1-2.

* cited by examiner

PROVIDING TEMPORARY CONTACT INFORMATION

BACKGROUND

The present invention relates generally to the field of electronic communication, and more particularly to providing temporary contact information and communication channels to prevent the misuse of contact information.

Contact information may be shared frequently and for various purposes. Individuals often need to give their mobile number, e-mail address, or other contact information to a recipient for a temporary or limited purpose. Temporary or limited purposes may include one-time communications, orders for a product or service, providing contact information for deliveries, etc.

SUMMARY

Embodiments of the present invention disclose a method, computer program product, and system for preventing misuse of contact information. A first contact information associated with a first user is identified. Temporary contact information for the first user is generated, the temporary contact information does not include the first contact information and is configured to cause communication using the first contact information when received from a second user. Termination controls associated with the temporary identification are generated. The termination controls are configured to prevent the use of the temporary contact information after the occurrence of an event.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
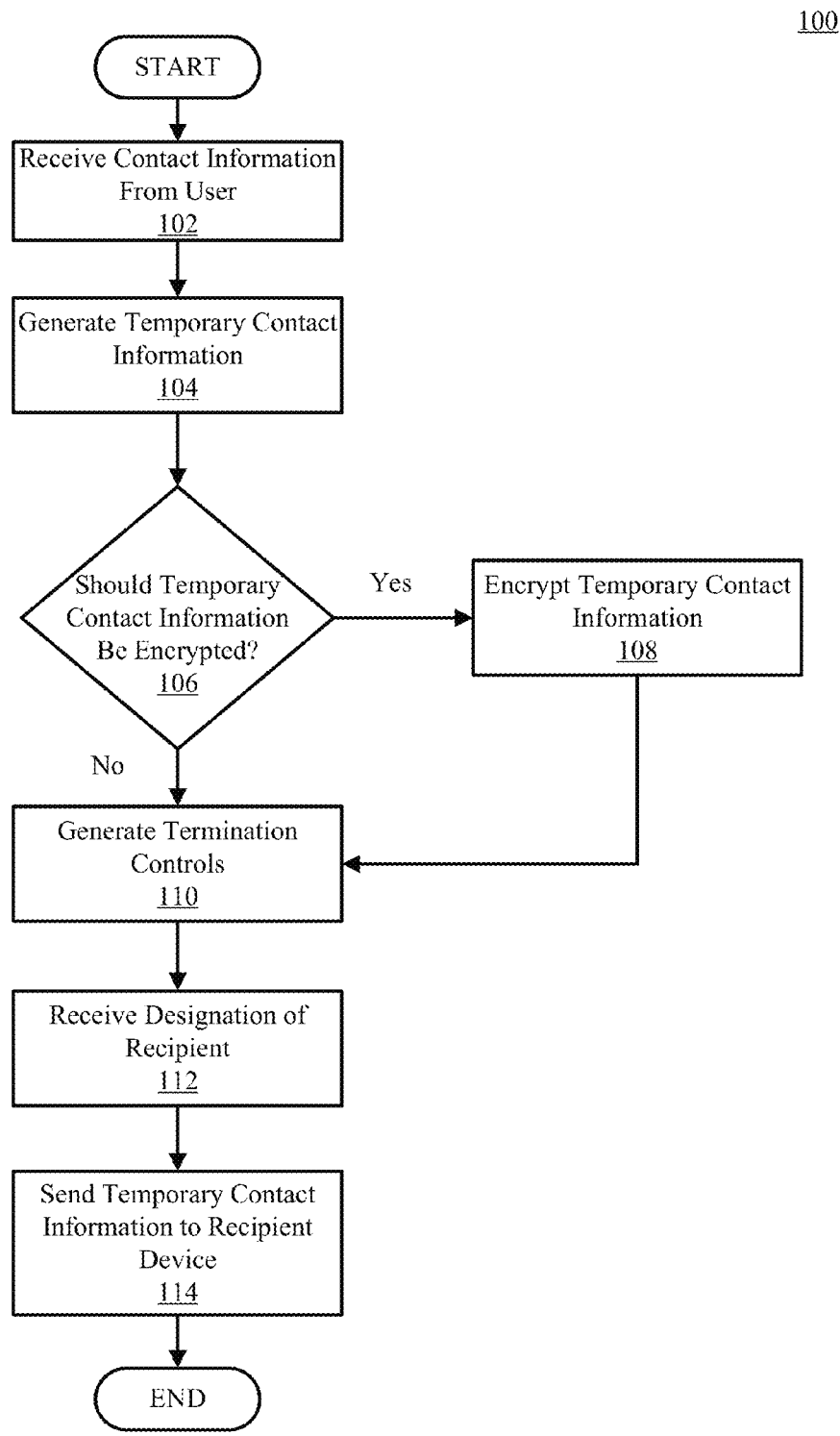
FIG. 1 illustrates a flowchart depicting a method for providing temporary contact information, according to embodiments.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate to electronic communication, and more particularly to providing temporary contact information and communication channels to prevent the misuse of contact information. While the present disclosure is not necessarily limited to such applications, various aspects of the disclosure may be appreciated through a discussion of various examples using this context.

When contact information is shared for a specific or temporary purpose, the owner of the contact information may desire to maintain a level of privacy, or to prevent the misuse or exploitation of his or her contact information. Communication applications may use pseudonyms (e.g., usernames) and/or encryption to maintain user privacy and deter misuse of users' contact information. For example, if Bob wishes to place an order for takeout from Jon's restaurant, Bob will likely need to give his phone number to one of Jon's employees. After the takeout is picked up and paid for, however, there is no need for Jon's employee to retain Bob's phone number. Additionally, there exists the possibility that any of Jon's employees with access to Bob's phone number may misuse it.

Pseudonyms, usernames, temporary e-mail addresses, and other forms of temporary contact information may be employed to obscure an individual's true contact information and prevent misuse thereof. Encryption techniques may also be employed to provide an additional layer of protection.

When contact information for a temporary purpose is left behind after a transaction, there remains at least a limited risk of misuse, especially when the contact information given for a temporary purpose is an individual's true contact information. Termination (e.g., erasure) of the temporary contact information from the recipient's possession may be used to provide yet another layer of protection against misuse, potential identity theft, or the like.

The present disclosure will now be described in detail with reference to the Figures. Referring now to FIG. 1, depicted is a method for creating a temporary contact information and sending it to a recipient, according to embodiments. In a computing environment 100, contact information is received from a user at 102. The computing environment may include, for example, a server (e.g., server 602 of FIG. 6) or a client device (e.g., client devices 610-625 of FIG. 6). The contact information may be an e-mail address, username, phone number, etc. For example, the contact information may be the e-mail address emailer123xyz@email.com.

At 104, temporary contact information may be generated. For example, temporary contact information (e.g., a pseudo-contact information, such as a username) may be randomly created and associated with the contact information. This may allow the server to route communications addressed to the temporary contact information to the user using the true contact information. In some embodiments, the communication may be addressed to the server and the server may identify temporary contact information that may be contained in the communication itself, such as, for example, in the metadata of the communication. For example, a pseudo-e-mail address example 987abc@pseudo.com may be created and associated with the contact information "emailer123xyz@email.com." Thus, the server may route communications addressed to, or otherwise associated with, the temporary contact information and route it to the user using the user contact information. For example, the server may receive an e-mail addressed to the temporary contact information "example 987abc@pseudo.com," which the server identifies as associated with the contact information "emailer123xyz@email.com." The server may then reroute the e-mail using the contact information as the destination address. The temporary contact information may, but is not required to, take on the same format as the contact information. For example, temporary contact information associated with a phone number may use a ten-digit string like other phone numbers, or it may take on alternative formats, such as a string of letters or words. For example, the phone number (123)456-7890 may be represented with the string of letters "bcdefghija." In some embodiments, the server may identify this string of letters as being associated with a user's contact information (e.g., phone number).

At 106, it may be determined whether the temporary contact information should be encrypted. For example, the user, via an interactive user interface, may request the temporary contact information be encrypted. The user may be presented with a variety of encryption types to choose from (e.g., AES, Blowfish, Triple DES, Twofish, RSA, etc.), or the encryption type may be predetermined. In some embodiments, encryption of the temporary contact information may occur automatically, without input from the user.

If the temporary contact information should be encrypted, then encryption occurs at 108. For example, an encryption algorithm may be used to transform the temporary contact information into an encrypted temporary contact information.

If the temporary contact information should not be encrypted, or if the temporary contact information has already been encrypted, the termination controls for the temporary contact information may be generated at 110. Termination controls may provide the ability to disable, invalidate, or otherwise terminate the temporary contact information so that it can no longer be used to contact the user. Termination controls may include, but are not limited to, for example, a self-executing metadata script configured to erase the temporary contact information upon occurrence of an event (e.g., 48 hours after creation, upon delivery confirmation, etc.). Termination controls may also include, but are not limited to, the ability, via an interactive user interface, for the user to remotely request a recipient's device to erase the temporary contact information from local storage. In some embodiments, termination controls may be executed in response to the occurrence of an event, and may include invalidation of the temporary contact information in response to the occurrence of an event, invalidation of encryption keys for encrypted contact information, etc.

At 112, a designation of a recipient of the temporary contact information may be received. For example, in the context of instant messaging, a first user may designate a second user associated with the username "Receiver_Of_Messages" as the recipient of the temporary contact information.

Figure 2:
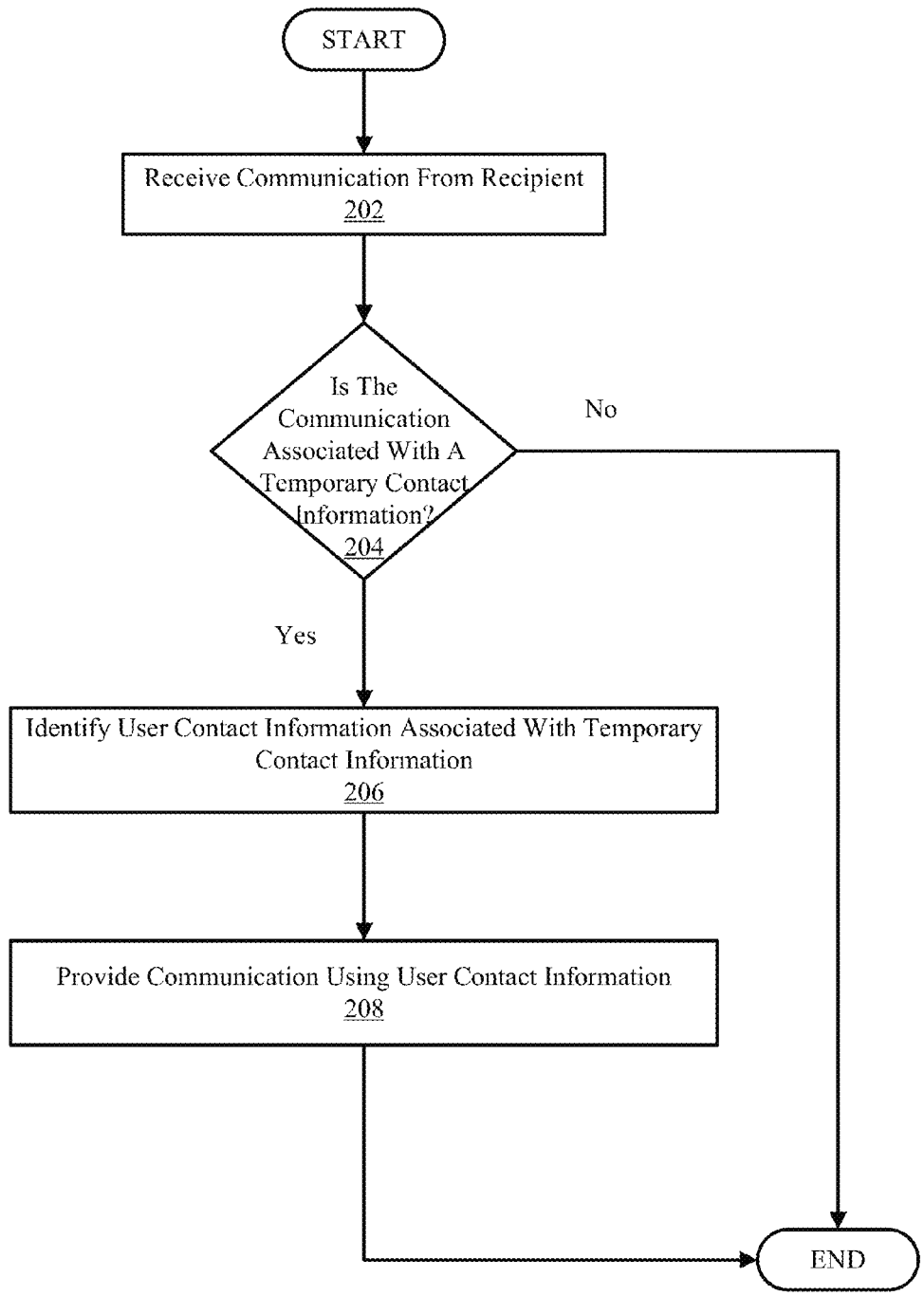
FIG. 2 is a flowchart depicting a method for creating a temporary contact information and sending it to a recipient, according to embodiments.

Referring now to FIG. 2, shown is a flowchart depicting a method for providing communication using temporary contact information in a computing environment 200. A computing environment may include, for example, a server (e.g., server 602 of FIG. 6) or a client device (e.g., client devices 610-625 of FIG. 6). At 202, communication is received from a recipient. A communication may include a phone call, text message, instant message, e-mail, etc. A recipient may be any individual that has received or will receive temporary contact information (e.g., a username, a unique encrypted number, etc.).

At 204, it is determined whether the communication is associated with a temporary contact information. For example, a communication may be addressed with the temporary contact information. In other embodiments, the communication may be addressed to the server, but contain temporary contact information within the body of the communication, within the metadata of the communication, etc. If the communication is not associated with a temporary contact information, the method terminates.

If the communication is associated with a temporary contact information, the user contact information associated with the temporary contact information is identified at 206. For example, user contact information may be associated with temporary contact information in a table, database, or other data structure. For example, if an instant message is sent to a server and addressed to "Temporary User 100," the server may query a database of temporary contact information to determine that "Temporary User 100" is associated with the user John Doe's contact information.

At 208, the user's contact information is used to provide communication. For example, in some embodiments, a server may use contact information (e.g., the username "John_Doe") to relay an instant message to the client device associated with the contact information. In some embodiments, the contact information may be used to initiate a phone call, a video conference, text messaging, e-mail communication, etc.

Figure 3:
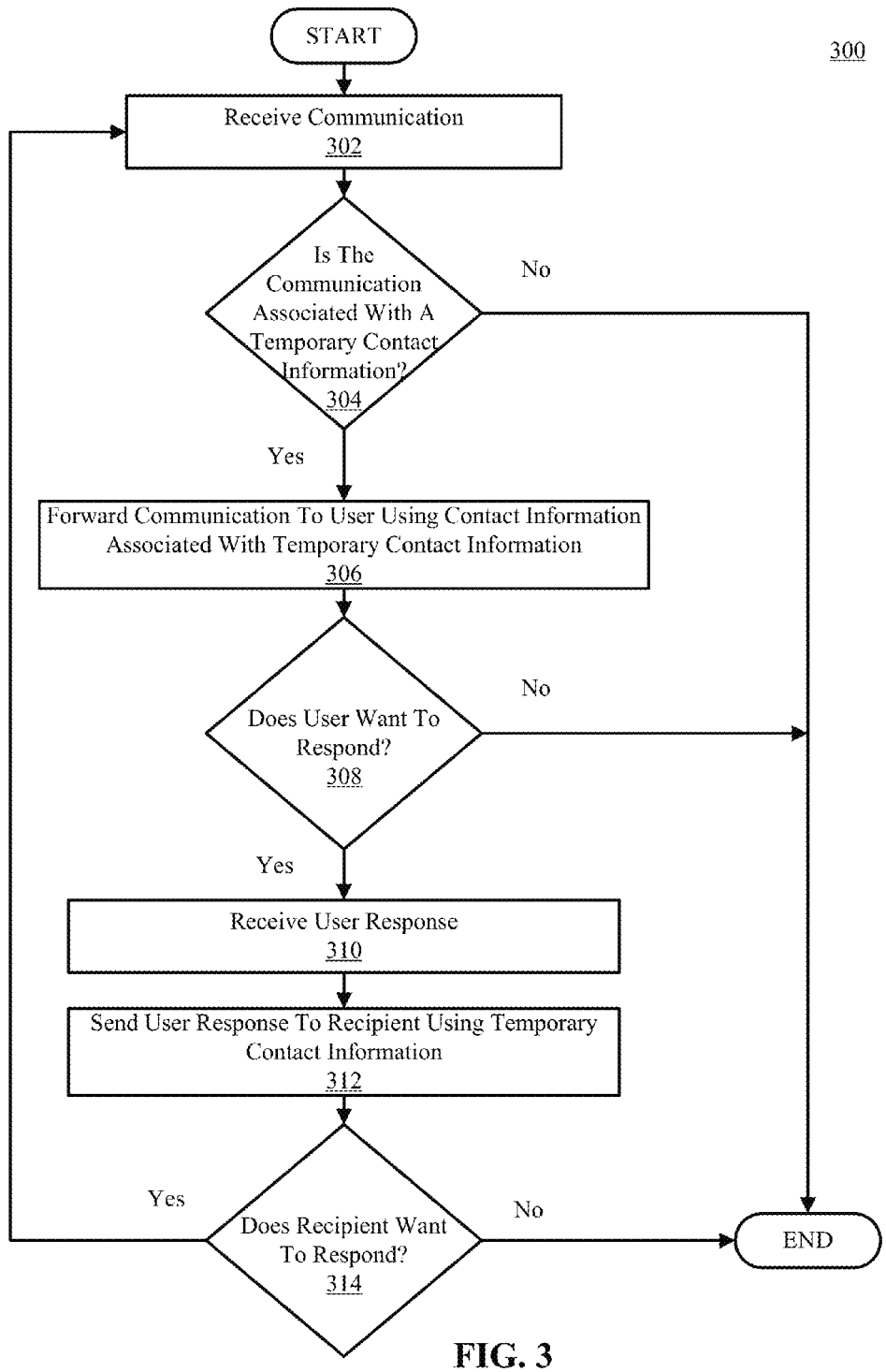
FIG. 3 is a flowchart depicting a method for receiving and sending communications between a user and a recipient, according to embodiments.

Referring now to FIG. 3, illustrated is a flowchart depicting a method for receiving and sending communications between a user and a recipient, in a computing environment 300, according to embodiments. The computing environment may include, for example, a server (e.g., server 602 of FIG. 6) and/or at least one client device (e.g., client devices 610-625 of FIG. 6).

At 302, a communication associated with temporary contact information may be received. The communication may be voice communication, such as a voice message; a text message; instant message; e-mail; etc.

At 304, it may be determined whether the communication is associated with a temporary contact information. For example, a communication may be addressed with the temporary contact information. In some embodiments, the communication may otherwise be associated with the temporary contact information, as described herein. If the communication is not associated with a temporary contact information, as determined by the server, the method may terminate.

If the communication is associated with a temporary contact information, the communication may be forwarded to the user, using the contact information associated with the temporary contact information, at 306. For example, a text message from a recipient may be sent, addressed to the user's temporary contact information, and the server may identify the user contact information associated with the temporary contact information by querying a data structure, such as a database or table. The server may then route the text message to the user using the user contact information. For example, a text message, "Message1," from Jerry may be associated with the temporary contact information (e.g., addressed to) "User1." Upon receiving Message1, the server may query a table of temporary contact information to determine that User1 is associated with user "Mary" at the phone number (555)-555-5555. The server may forward Message1 to Mary using phone number (555)555-5555.

At 308, it may be determined whether the user wants to respond. If not, the method terminates. If it is determined that the user wants to respond, a user response is received at 310. The determination may be performed by querying the user's client device via an interactive user interface, by waiting for a predetermined waiting period and receiving a response within that waiting period, or in another manner suitable for the determination. For example, a server may receive a response from user Mary within a predetermined 30-second waiting period.

Responsive to receiving the user's response at 310, the response may be sent to the original recipient using the temporary contact information at 312. For example, upon receiving a text message from the user, the user's contact information may be again substituted with the temporary contact information and sent to the original recipient. For example, the temporary contact information "User1" may be substituted for user Mary's telephone number (555)555-5555 and Mary's response, "Response2," may be sent to Jerry, such that Jerry receives Mary's temporary contact information, but not Mary's name or phone number.

At 314, it may be determined whether the recipient wants to respond. If not, the method may terminate. This may be determined after a predetermined waiting period lapses, or by an indication from the recipient. If the recipient wishes to respond, the method may cycle back to 302. For example, if Jerry does not wish to respond to "Response2," he may either wait for the waiting period to lapse, or he may input an indication that he does not wish to respond. This may be done, for example, by responding to a query from the server, by closing the messaging program, closing the message window, or in a similar way.

Figure 4:
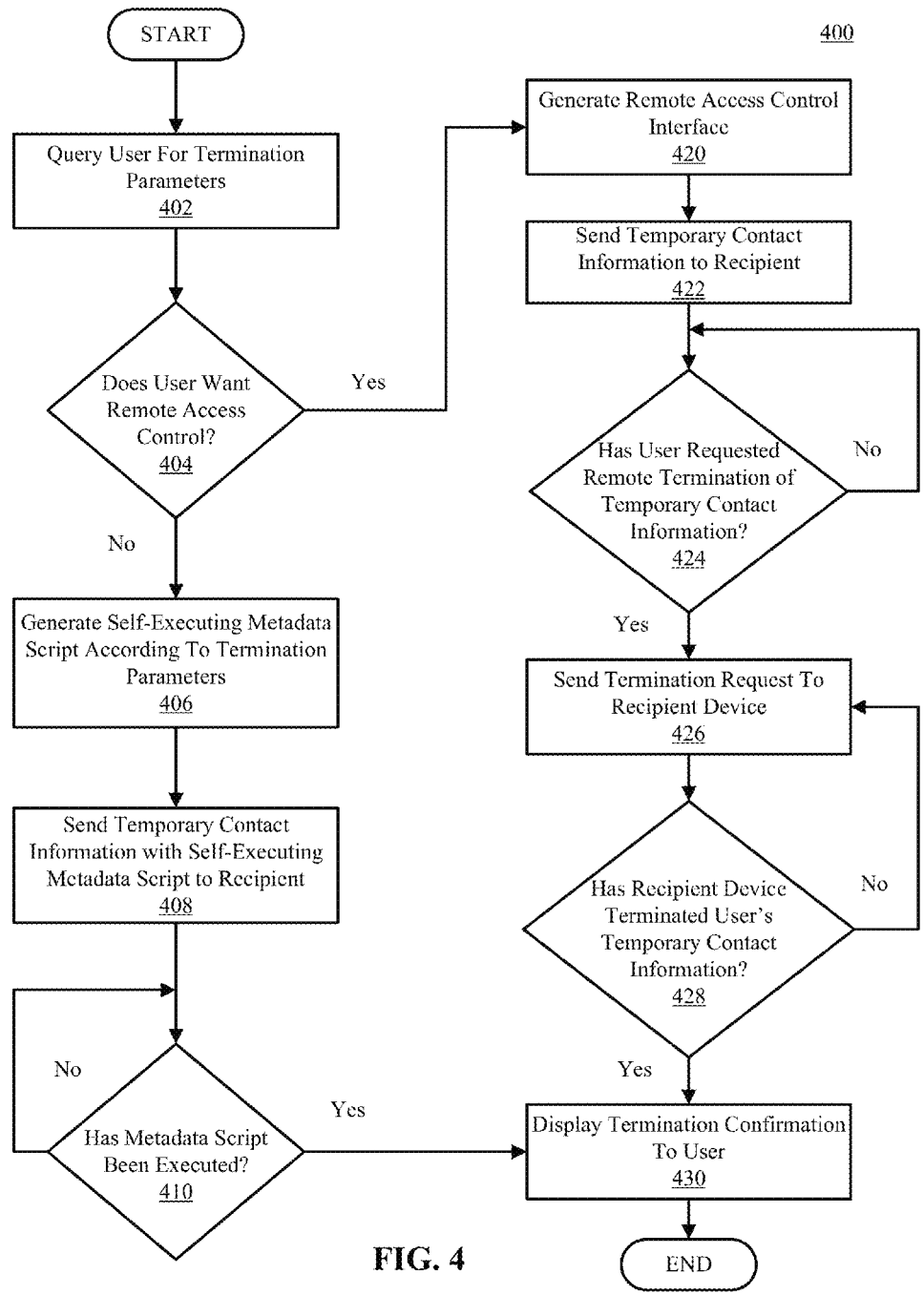
FIG. 4 is a flowchart depicting a method for creating and managing termination controls, according to embodiments.

Referring now to FIG. 4, illustrated is a flowchart depicting a method for creating and managing termination controls in a computing environment 400, according to embodiments. The computing environment may occur, for example, on a server (e.g., server 602 of FIG. 6) and/or on at least one client device (e.g., client devices 610-625 of FIG. 6).

At 402, the user may be queried for termination parameters. Termination parameters may describe the desired prerequisite conditions for termination of the temporary contact information. Termination parameters may be based on the occurrence of an event, as a function of time, on future user input (e.g., remote access control described below), etc. For example, a user may want the temporary contact information to terminate (e.g., be invalidated, be erased, etc.) 12 hours after creation of the temporary contact information, or the user may want the temporary contact information to terminate only after the user initiates a termination request.

At 404, it may be determined whether the user wants remote access control. In some embodiments, this may be determined in response to the termination parameters query of 402. Remote access control may allow the user to actively manage a recipient's access to the user's temporary contact information. For example, it may allow the user to send, from a client device, a termination request to the server, causing the server to relay the termination request to the recipient's device, further causing the recipient's device to erase, invalidate, or otherwise terminate the temporary contact information.

If the user does not want to have remote access control, a self-executing metadata script may be generated at 406, according to the termination parameters described at 402. The termination parameters may include, but are not limited to, functions of time, the number of times the temporary contact information has been accessed by the recipient, the occurrence of an event, etc. A self-executing metadata script may, for example, cause the recipient's device to erase the temporary contact information three days after the temporary contact information was first accessed by the recipient.

At 408, the temporary contact information with the self-executing metadata script is sent to the recipient. For example, user Blake's temporary contact information with a self-executing metadata script may be sent to recipient Leroy.

At 410, it may be determined whether the metadata script has been executed. This may be performed by querying the recipient's device at predetermined intervals. For example, the server may query Leroy's device every five minutes to determine whether the script has executed. If the script has not executed, the server may continue to query the recipient's device. In embodiments, the script may also notify the server prior to, or in concert with, termination of the temporary contact information. For example, prior to self-termination, the metadata script in Blake's temporary contact information may send a notification to the server of the impending self-termination.

If the server determines that the script has executed, a termination confirmation is displayed to the user at 430. For example, after Blake's temporary contact information has executed a script erasing that temporary contact information from Leroy's device, a confirmation notice may be sent to, and displayed on, Blake's device. The confirmation notice may be, for example, a notification window in an interactive user interface, a push notification sent to the user's device, etc.

If, at 404, it is determined that the user wants remote access control, a remote access control interface may be generated at 420. Remote access control may allow a user to establish recipient access to temporary contact information, manage validity parameters, termination controls, etc. A remote access control interface may include, for example, an interactive user interface, established on the user's device, which allows the user to manage termination parameters in real time. For example, user Beth may want her temporary contact information to be erased, but only after the recipient, Meridith, has delivered a batch of cookies to Kimberly. As such, Beth may decide she wants remote access control so she may send a termination request only after talking to Kimberly and ensuring the cookies were delivered.

At 422, the temporary contact information may be sent to the recipient. For example, temporary contact information may be sent to the designated recipient, as discussed herein.

At 424, it may be determined whether the user has requested remote termination of the temporary contact information. If not, the determination may be made again at regular or predetermined intervals, as defined by the termination parameters, or according to a default or predetermined interval. For example, the server may determine that Beth has not yet sent a termination request, and makes this determination every 20 minutes, as described in the termination parameters set by Beth.

If the user has requested termination of the temporary contact information, a termination request may be sent to the recipient device at 426. For example, if the server determines that user Beth sent a termination request, the server may forward the termination request to recipient Meridith's device.

At 428, it may be determined whether the recipient's device has terminated the user's temporary contact information. If not, the termination request may be sent again at regular or predetermined intervals. For example, if the server determines that user Beth has sent a termination request to recipient Meridith's device, and the server cannot confirm that Meridith's device has terminated (e.g., erased, invalidated, etc.) Beth's temporary contact information, the termination request may be sent to Meridith's device every 30 seconds until Meredith's device confirms the termination of Beth's temporary contact information.

If it is determined that the recipient device has terminated the user's temporary contact information, a termination confirmation may be displayed to the user at 430. A termination confirmation may include a notification window, a sound, a vibration, etc. For example, if the server determines that recipient Meridith's device terminated user Beth's temporary contact information, the server may send a termination confirmation, to be displayed on Beth's device as a pop-up window.

Figure 5:
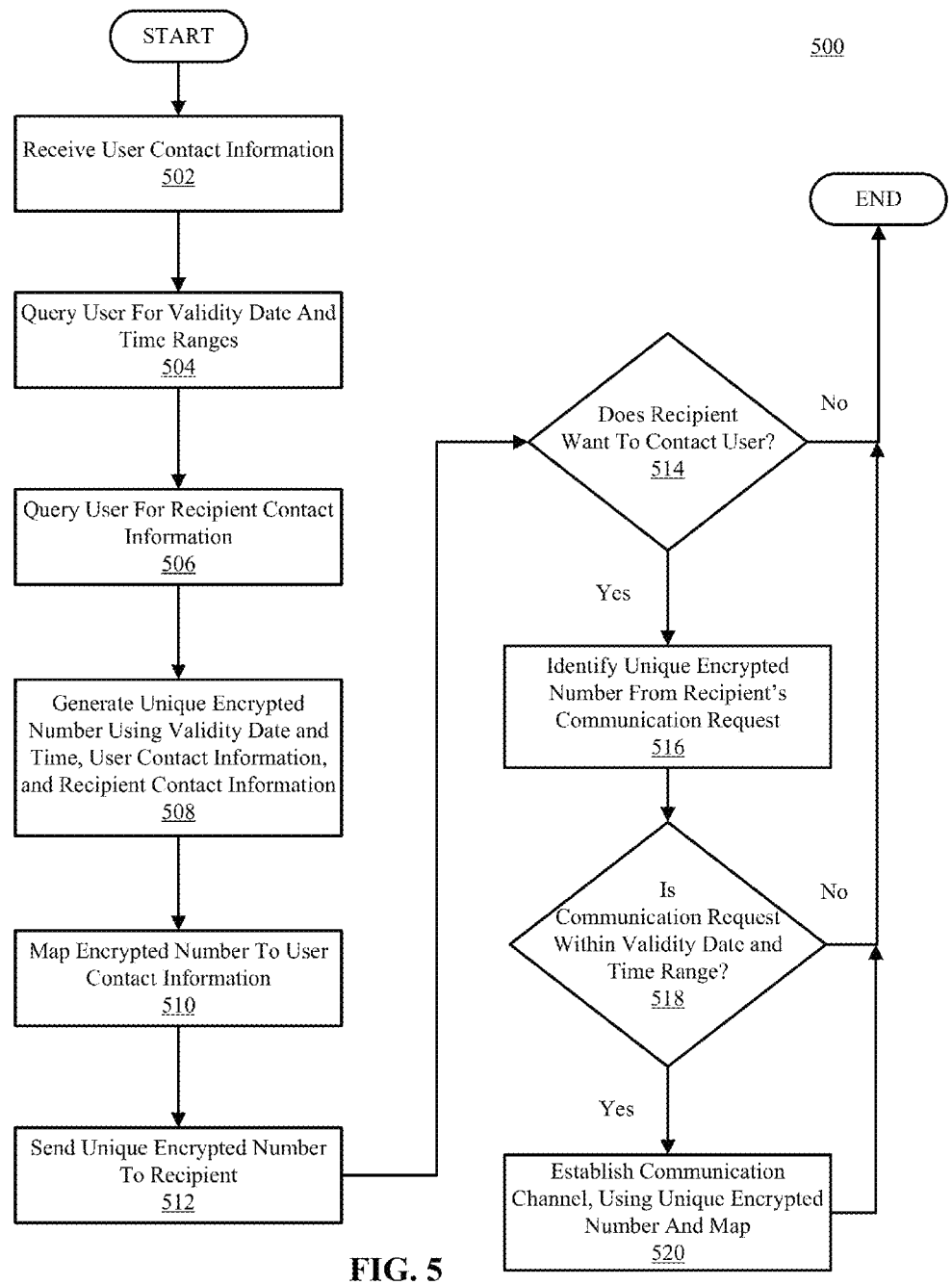
FIG. 5 is a flowchart depicting a method for providing temporary contact information using encryption and validity date and time ranges, according to embodiments.

Referring not to FIG. 5, illustrated is a flowchart depicting a method for providing temporary contact information using encryption and validity date and time ranges in a computing environment 500, according to embodiments. The computing environment may occur, for example, on a server (e.g., server 602 of FIG. 6) and/or on at least one client device (e.g., client devices 610-625 of FIG. 6).

At 502, user contact information may be received. For example, a phone number for a user may be received by a server.

At 504, the user may be queried for validity date and time ranges. For example, a server may send a request to user Jeremy's device, querying Jeremy via an interactive user interface, for the dates and/or duration of time that Jeremy wants the temporary contact information to be valid.

At 506, the user may be queried for the recipient's contact information. For example, the server may send a request to user Jeremy's device, querying Jeremy, via an interactive user interface, for the contact information of a recipient.

At 508, a unique, encrypted number may be generated, using the validity date and time ranges from 504, the user contact information from 502, and the recipient contact information from 506 as input. For example, if user Jeremy's phone number is (777)777-7777; the validity date and time ranges are 8/26/16, 3:00 pm-8/30/16, 4:30 pm; and the recipient is Jane, whose phone number is (222)222-2222; this unique information may be used as input for an encryption algorithm, the algorithm output resulting in a unique, encrypted number.

At 510, the unique, encrypted number may be mapped to the user's contact information. For example, the unique, encrypted number may be entered into a table, database, or other searchable data structure and associated with the user's contact information.

At 512, the unique, encrypted number may be sent to the recipient. For example, the unique, encrypted number generated in the exemplary description of 508 may be sent to Jane, using Jane's phone number.

At 514, it may be determined whether the recipient wants to contact the user. If not, the method terminates. For example, if Jane does not want to contact Jeremy, the method may terminate.

If the recipient wants to contact the user, the unique encrypted number may be identified from the recipient's communication request at 516. For example, if Jane wants to contact Jeremy, the unique, encrypted number generated in the exemplary description of 508 may be identified from the communication request received from Jane.

At 518, it may be determined whether the communication request has been received within the validity date and time range. If not, the method may terminate. For example, using the exemplary description of 508, if the communication request is received outside the validity date and time range of 8/26/16, 3:00 pm-8/30/16, 4:30 pm, the method may terminate.

At 520, if it is determined that the communication request has been received within the validity date and time range, a communication channel may be established using the unique, encrypted number and the map from 510 to identify the user's contact information. For example, using the exemplary description from 508, if the unique, encrypted number is received between 8/26/16, 3:00 pm and 8/30/16, 4:30 pm, the unique, encrypted number may mapped back to the Jeremy's contact information. This may be done by querying a database or data structure, as contemplated at 510, and a communication channel may be established. For example, the server may establish a phone call between Jane and Jeremy.

Figure 6:
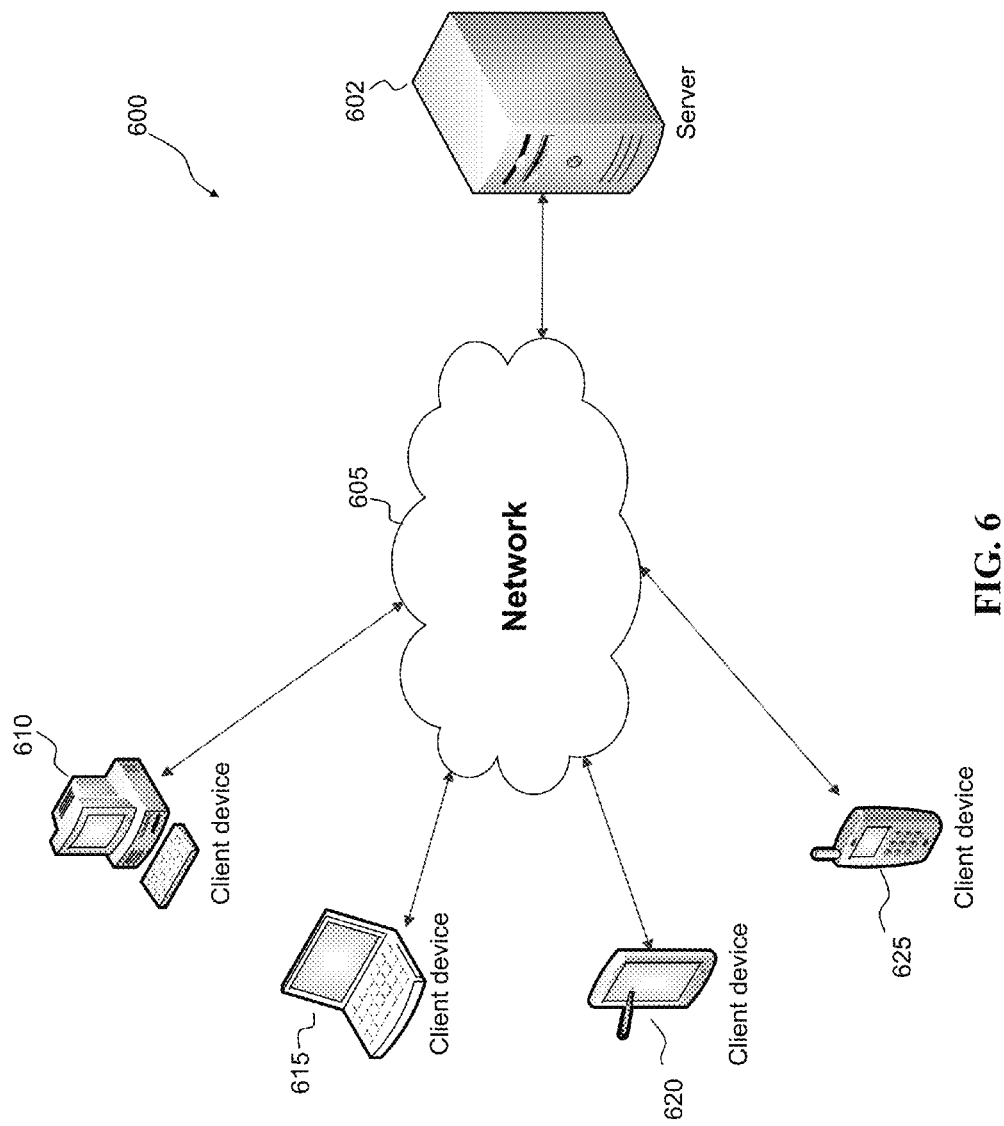
FIG. 6 illustrates a diagram of a network environment, according to embodiments.

FIG. 6 is a diagram illustrating an example network system 600 for communication between a server 602 and client devices 610, 615, 620, and 625 over a network 605. In some embodiments, each client device may be under the control of a different user or recipient, or multiple client devices may be under the control of a single user. A client device may be a computing system, e.g. a desktop computer, a laptop computer, a tablet, a smartphone, a portable terminal, or one or more programs, devices, or combination thereof capable of processing digital content and configured to connect to a network and communicate with any number of servers or client devices.

Network 605 may be any type or combination of networks. For example, the network may include any combination of personal area network (PAN), local area network (LAN), metropolitan area network (MAN), wide area network (WAN), wireless local area network (WLAN), storage area network (SAN), enterprise private network (EPN), or virtual private network (VPN). In some embodiments, the network 605 may refer to an IP network, a conventional coaxial-based network, etc. For example, a server including an instant messaging application may communicate with various client devices (e.g., tablets, laptops, smartphones, portable terminals, etc.) over the Internet.

In some embodiments, the server 602 may refer to a computing system, e.g., one or more programs, devices, or combination thereof capable of processing digital information and configured to connect to a network and communicate with any number of client devices or servers. In some embodiments, the server 602 may be implemented in a cloud computing environment.

In some embodiments, the flowcharts of FIG. 1-FIG. 5 may be performed, in whole or in part, by the server 602. The server and client(s) may communicate digital information (e.g., temporary contact information, communications, etc.), as well as requests therefor over the network 605.

Figure 7:
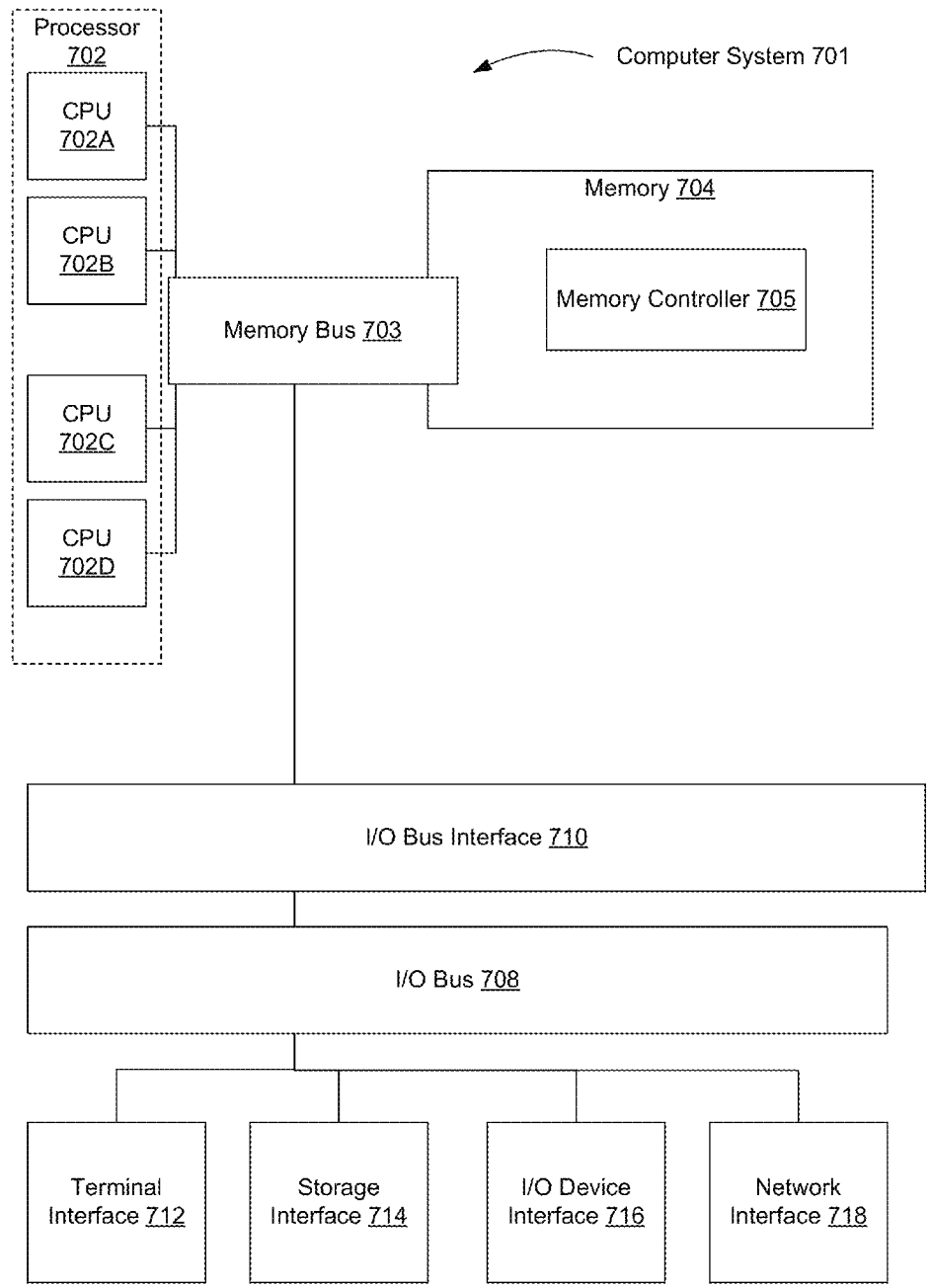
FIG. 7 illustrates a high-level block diagram of an example computer system that may be used in implementing embodiments of the present disclosure.

Referring now to FIG. 7, shown is a high-level block diagram of an example computer system (i.e., computer) 701 that may be configured to perform various aspects of the present disclosure, including, for example, methods 100-500, described in FIG. 1-FIG. 5, respectively. The example computer system 701 may be used in implementing one or more of the methods or modules, and any related functions or operations, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for preventing misuse of contact information, the method comprising:
   identifying a first contact information associated with a first user, the first contact information comprising a phone number;
   generating, on a server, encrypted temporary contact information for the first user, the temporary contact information excluding the first contact information, the encrypted temporary contact information configured to be valid during a date and time range and to cause communication, routed through the server, using the first contact information when received from a second user;
   generating termination controls, based on termination parameters provided by the first user via an interactive user interface, the termination controls associated with the encrypted temporary contact information, the termination controls configured to prevent use of the encrypted temporary identification after occurrence of an event, the event comprising a determination that the first user is no longer communicating with the second user, and wherein the termination controls comprise the ability to remotely, via the server, erase the encrypted temporary contact information from the second user's device and an executable script in the metadata of the encrypted temporary contact information, the executable script configured to erase the encrypted temporary contact information in response to occurrence of the event;
   receiving, from the first user, a designation of the second user to receive the encrypted temporary contact information;
   providing, to the second user, the encrypted temporary contact information;
   receiving, from the second user, a first communication, at the server, using the encrypted temporary contact information, the first communication comprising a text message;
   querying a database of encrypted temporary contact information to identify the associated first contact information;
   communicating, via the server, the first communication to the first user using the first contact information;
   determining, based on a function of time where the first user has received a communication from the second user and has not responded, that the first user is not communicating to the second user;
   terminating, in response to occurrence of the event, the encrypted temporary contact information for the first user, via the termination controls; and
   displaying, to the first user, a termination confirmation.

* * * * *